(12) United States Patent
Gerrese et al.

(10) Patent No.: US 12,125,118 B2
(45) Date of Patent: *Oct. 22, 2024

(54) AUTONOMOUS CHAUFFEUR

(71) Applicant: GM Cruise Holdings LLC, San Francisco, CA (US)

(72) Inventors: Alexander Willem Gerrese, San Francisco, CA (US); Aakanksha Mirdha, San Francisco, CA (US); Ashley Sams, San Francisco, CA (US); Swarnakshi Kapil, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,250

(22) Filed: Sep. 13, 2023

(65) Prior Publication Data

US 2024/0005438 A1 Jan. 4, 2024

Related U.S. Application Data

(63) Continuation of application No. 17/474,660, filed on Sep. 14, 2021, now Pat. No. 11,790,474.

(51) Int. Cl.
| | |
|---|---|
| *G06Q 10/00* | (2023.01) |
| *B60W 60/00* | (2020.01) |
| *G06Q 10/0631* | (2023.01) |
| *G06Q 10/1093* | (2023.01) |
| *G06Q 50/00* | (2024.01) |
| *G06Q 50/40* | (2024.01) |

(52) U.S. Cl.
CPC ......... *G06Q 50/40* (2024.01); *B60W 60/0025* (2020.02); *G06Q 10/06314* (2013.01); *G06Q 10/1095* (2013.01); *B60W 2556/45* (2020.02)

(58) Field of Classification Search
None
See application file for complete search history.

(56) References Cited

U.S. PATENT DOCUMENTS

| | | | |
|---|---|---|---|
| 2017/0109705 A1* | 4/2017 | Guerra | G06Q 10/1095 |
| 2018/0137470 A1* | 5/2018 | Donnelly | H04W 4/44 |
| 2018/0189744 A1* | 7/2018 | Frank | G06F 21/6218 |
| 2023/0316235 A1* | 10/2023 | Heaton | B60W 40/09 |
| | | | 705/7.19 |

OTHER PUBLICATIONS

Bucchiarone, A., Battisti, S., Marconi, A., Maldacea, R., & Ponce, D. C. (2020). Autonomous shuttle-as-a-service (ASaaS): Challenges, opportunities, and social implications. IEEE Transactions on Intelligent Transportation Systems, 22(6), 3790-3799 (Year: 2020).*

* cited by examiner

*Primary Examiner* — Matheus Ribeiro Stivaletti

(57) ABSTRACT

Systems and methods for providing autonomous chauffeur services. In particular, systems and methods are provided to integrate users' calendars with a ridehail application to provide personal chauffeur-type services. Integrating a ridehail service application with a user's calendar and online schedule enables the ridehail service to act as a personal around-the-clock chauffeur, with an autonomous vehicle appearing when needed and taking the user to their destination with no additional input.

20 Claims, 10 Drawing Sheets

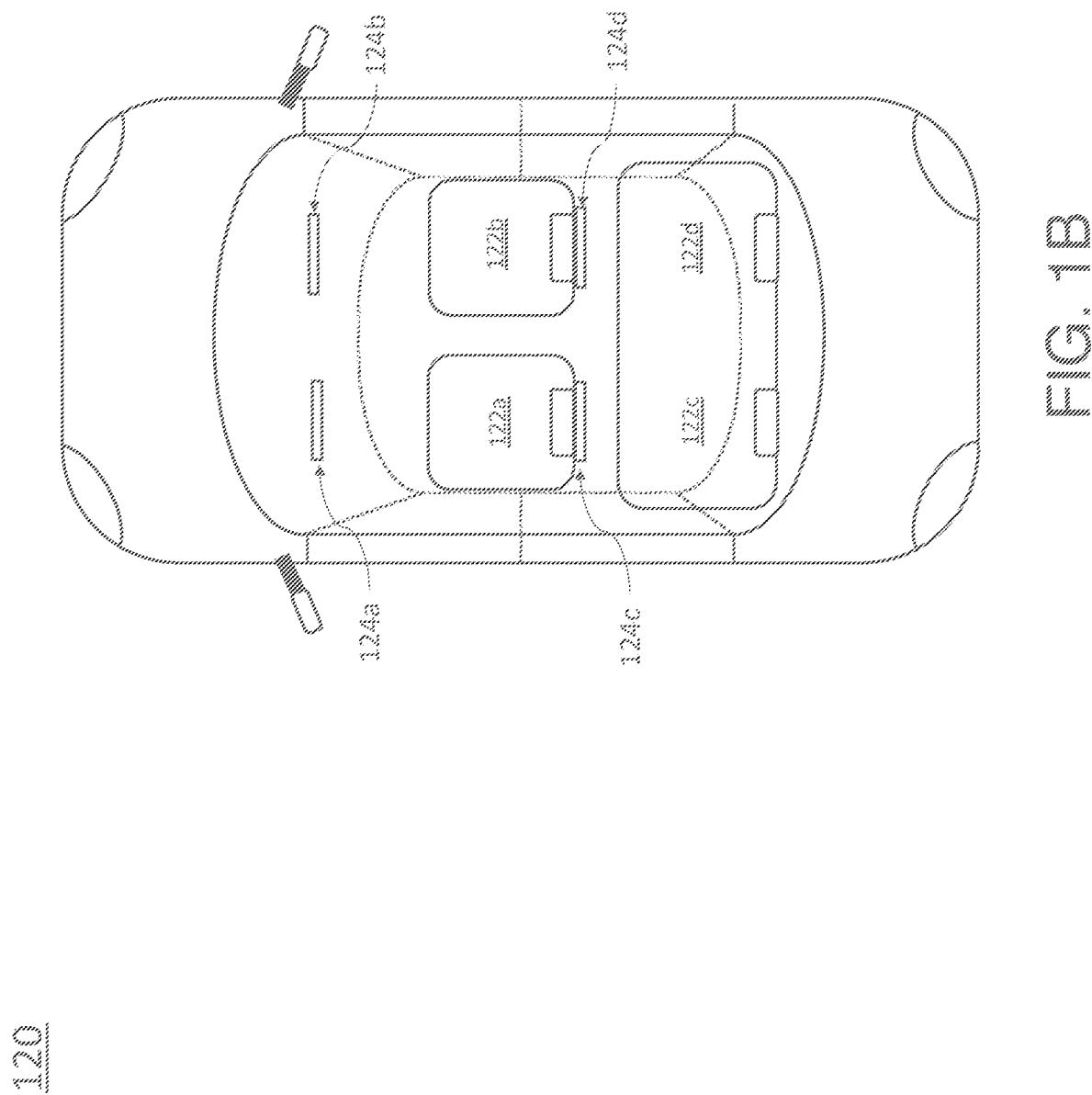

AUTONOMOUS CHAUFFEUR

CROSS-REFERENCE TO RELATED APPLICATION(S)

This application claims the benefit of and hereby incorporates by reference, for all purposes, the entirety of the contents of U.S. Nonprovisional application Ser. No. 17/474,660 filed Sep. 14, 2021, and entitled, "AUTONOMOUS CHAUFFEUR".

FIELD OF THE DISCLOSURE

The present disclosure relates generally to autonomous vehicles (AVs) and to systems and methods for providing chauffeur services.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles can be used to provide rides to passengers for various types of errands and outings. When users have a planned event, users also have to plan how to get to and from the event. When using various forms of public transportation, users determine schedules, timing, and ticket purchasing. When driving personal vehicles, users have to plan for gas refilling, parking location, driving route, and departure time based on traffic conditions. While autonomous vehicles can be used to alleviate some inconveniences, users still input pick-up and drop-off locations, and need to determine what time to order a vehicle.

SUMMARY

Systems and methods are provided to integrate users' calendars with ridehail applications to autonomously provide personal chauffeur-type services. In particular, integrating a ridehail service application with a user's calendar and online schedule enables the ridehail service to act as a personal around-the-clock chauffeur, with an autonomous vehicle appearing when needed and taking the user to their destination with no additional input. By integrating a ridehail application with a user's digital calendar, a zero-touch model is provided for autonomously generating autonomous vehicle ride requests to and/or from user calendar events.

According to one aspect, a method for autonomous chauffeuring comprises receiving a calendar event from a user calendar; determining a location of the calendar event; adding an autonomous vehicle ride event to the user calendar, wherein the autonomous vehicle ride event comprises at least one of a first ride to the calendar event, a second ride from the calendar event, and a third ride during the calendar event; and transmitting an autonomous vehicle ride request to a ridehail service for the autonomous vehicle ride event.

In some implementations, the method further includes transmitting an autonomous vehicle ride suggestion for the autonomous vehicle ride event to the user calendar. In some implementations, the method further includes receiving an autonomous vehicle ride acceptance. In some implementations, the method further includes presenting a ride cancellation option, wherein acceptance of the ride cancellation option results in deletion of the autonomous vehicle ride event and cancellation of the autonomous vehicle ride request. In some implementations, the calendar event is a first calendar event and further comprising receiving a second calendar event, wherein the second calendar event overlaps with the autonomous vehicle ride event. In some implementations, the method further includes determining whether at least one of the first calendar event and the second calendar event is a virtual meeting. In some implementations, the method further includes scheduling the autonomous vehicle ride event for the duration of the virtual meeting, determining a link for the virtual meeting, and autonomously connecting to the virtual meeting at the start time.

In some implementations, the method further includes receiving, in a ridehail application, permission to access the user calendar. In some implementations, when the autonomous vehicle ride event comprises the third ride during the calendar event, the calendar event is a virtual meeting. In some implementations, the method further includes scheduling the autonomous vehicle ride event for the duration of the virtual meeting, determining a link for the virtual meeting, and autonomously connecting to the virtual meeting at the start time. In some implementations, the method further includes identifying additional participants for the calendar event, and proactively pooling the additional event participants in the ride request. In some examples, the ridehail service comprises a rideshare service.

According to another aspect, a system for autonomous chauffeur services comprises a ridehail application configured to: receive a calendar event, determine a calendar event location, autonomously add an autonomous vehicle ride event associated with the calendar event to the user calendar, and transmit an autonomous vehicle ride request to a ridehail service for the autonomous vehicle ride event; and a central computing system configured to: receive the autonomous vehicle ride request, schedule a corresponding autonomous vehicle ride, and select an autonomous vehicle for the corresponding autonomous vehicle ride from an autonomous vehicle fleet.

In some implementations, the ridehail application is further configured to present a ride cancellation option, wherein acceptance of the ride cancellation option results in deletion of the autonomous vehicle ride event and cancellation of the autonomous vehicle ride request. In some implementations, the calendar event is a first calendar event and wherein the ridehail application is further configured to receive a second calendar event, wherein the second calendar event overlaps with the autonomous vehicle ride event. In some implementations, the ridehail application is further configured to determine whether at least one of the first calendar event and the second calendar event is a virtual meeting. In some implementations, the ridehail application is further configured to schedule the autonomous vehicle ride event to begin before the virtual meeting start time and continue for the duration of the virtual meeting, determine a link for the virtual meeting, and autonomously connect to the virtual meeting at the start time.

According to another aspect, a system for autonomous chauffeur services in an autonomous vehicle fleet comprises a ridehail application configured to integrate with a digital calendar including a plurality of calendar events and further configured to autonomously create a plurality of autonomous vehicle ride requests associated with respective calendar events of the plurality of calendar events; and a ridehail service configured to receive the plurality of autonomous vehicle ride requests from the ridehail application, associate each of the plurality of autonomous vehicle ride requests with a user account, and create a schedule of ride requests.

In some implementations, the ridehail application is further configured to present a ride cancellation option, wherein acceptance of the ride cancellation option results in cancellation of the autonomous vehicle request. In some implementations, the ridehail service is further configured to periodically present the schedule of ride requests fora selected period of time. In some implementations, the ridehail service is further configured to identify additional participants for each of the plurality of calendar events and proactively pool additional event participants to corresponding autonomous vehicle ride requests.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which:

FIGS. 1A-1B is a diagram illustrating an autonomous vehicle, according to some embodiments of the disclosure;

DETAILED DESCRIPTION

Overview

Figure 1A:
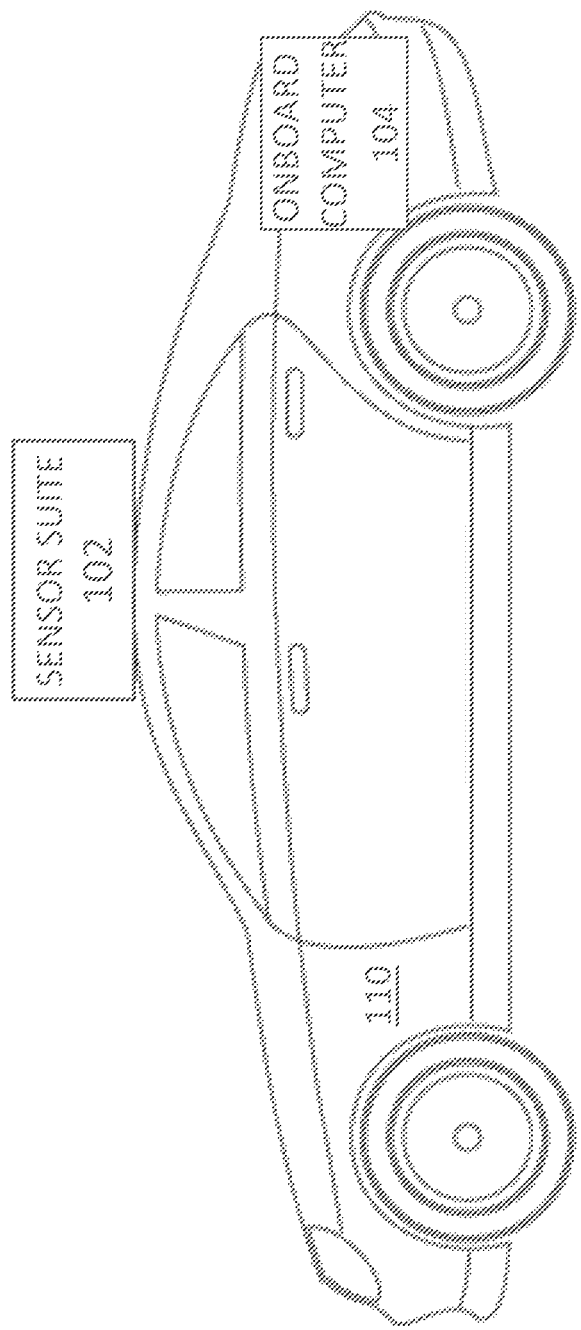

Systems and methods are provided to integrate users' calendars with ridehail applications to provide personal chauffeur-type services. In particular, integrating a ridehail service application with a user's calendar and online schedule enables the ridehail service to act as a personal around-the-clock chauffeur, with an autonomous vehicle appearing when needed and taking the user to their destination with no additional input.

Many people's lives today are organized in digital calendars. Many digitally-scheduled events automatically appear in a user's calendar, and others are manually entered. However, even with this trove of data, transportation to and from these events is not seamlessly integrated. Driving to an event in a personal vehicle still involves advanced planning to ensure there is sufficient gas in the vehicle, determine departure time, decide what route to take, and determine where to park at (or near) the destination. Taking public transportation involves determining schedules, timing, and ride durations, as well as purchasing tickets. While autonomous vehicles can be used to alleviate some inconveniences, users still need to input pick-up and drop-off locations, as well as determine when to request that the vehicle arrive. A personal driver is expensive and still requires direction, including destination information and pick-up times. Thus, all available modes of transportation currently involve user planning as well as some unpredictability.

Systems and methods are provided herein to integrate user calendar data with a ridehail service, such that a ridehail service can pre-fill pick-up and drop-off locations and determine pick-up time, all with no input from a user. In various examples, a user can easily opt-in and/or opt-out in response to a prompt on a mobile device. A single button can be presented to allow a user to accept and/or decline an autonomous vehicle ride for a calendar event. In some examples, the option can be presented when the event is scheduled and/or entered in the calendar. In some examples, the option can be presented when a calendar event reminder is sent.

When a user allows a ridehail application to integrate with the user's calendar, the ridehail application can use calendar information in conjunction with other data to provide an autonomous chauffeur service. For example, the ridehail service has information including the user's current location, real-time traffic conditions, and real-time autonomous vehicle dispatch information. Using this information, the ridehail service can calculate when to dispatch a nearby vehicle to a user's location so that the user will arrive at their destination on time, all without receiving any user input. Thus, the zero touch model discussed herein provides rides to users with no planning and no hassle, and, aside from adding the initial calendar event, no interaction with the ridehail application. In some implementations, the systems and methods discussed herein can help encourage users to choose autonomous ridehail services over personal car ownership.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Autonomous Chauffeur Services

FIGS. 1A and 1B are diagrams 100, 120 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured to provide autonomous chauffeur services.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1A functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

FIG. 1B shows a cutaway top view of the autonomous vehicle 110, according to various embodiments of the disclosure. As shown in FIG. 1B, there are four passenger seats 122a, 122b, 122c, 122d in the autonomous vehicle 110. In front of each passenger seat 122a, 122b, 122c, 122d is a screen 124a, 124b, 124c, 124d. In various examples, the screens 124a, 124b, 124c, 124d can be used for virtual meetings and video conferences. In particular, a passenger sitting in the first seat 122a can view the first screen 124a, a passenger sitting in the second seat 122b can view the second screen 124b, a passenger sitting in the third seat 122c can view the third screen 124c, and a passenger sitting in the fourth seat 122d can view the fourth screen 124d. In some examples, each screen 124a-124d is equipped with a video camera, which can be used to video the respective passenger for a virtual meeting. In some examples, separate cameras within the vehicle 110 are used to video a passenger participating in a virtual meeting. Similarly, in some examples, each screen 124a-124d is equipped with a microphone, which can be used to pick-up the respective passenger's voice for a virtual meeting. In some examples, separate microphones within the vehicle 110 are used to record a passenger participating in a virtual meeting.

In various implementations, one virtual meeting takes place at a time in the autonomous vehicle. In some examples, the autonomous vehicle 110 includes multiple passengers, but only one of the passengers is participating in a virtual meeting. In some examples, multiple vehicle passengers attend virtual meetings in the vehicle 110. In some examples, multiple vehicle passengers attend the same meeting from different seats 122a-122d in the vehicle 110.

Example Method for Autonomous Chauffeur Services

Figure 2A:
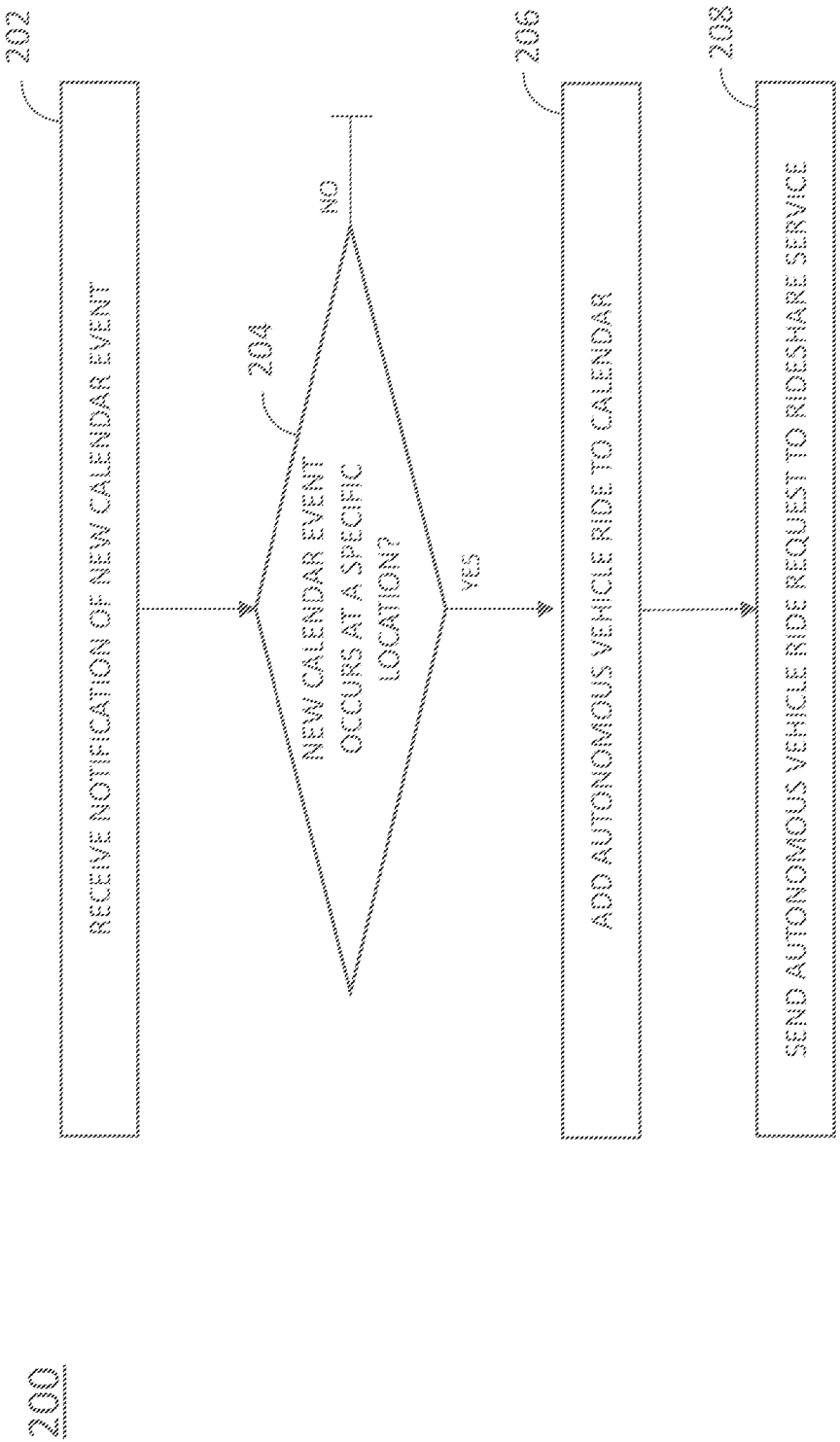
FIGS. 2A-2B is a diagram showing a method for an autonomous chauffeur, according to some embodiments of the disclosure.
Figure 2B:
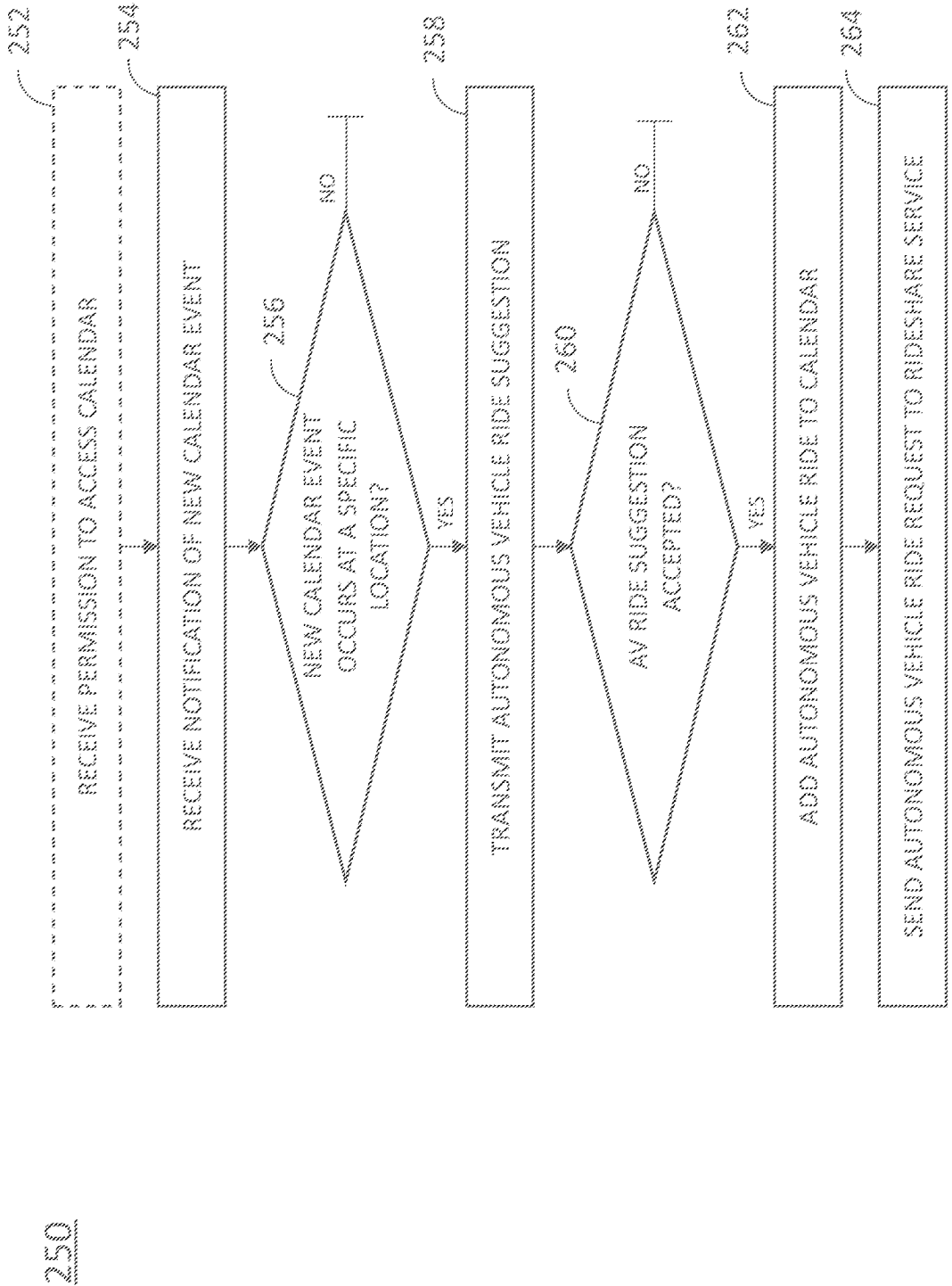

FIGS. 2A and 2B are diagrams illustrating methods 200, 250 for providing autonomous chauffeur services, according to some embodiments of the disclosure. FIG. 2A illustrates a method 200 for providing autonomous chauffeur services to a user who has provided ongoing permission for the ridehail application to integrate with the user's calendar. In various examples, the method 200 is a zero-touch system that autonomously creates autonomous vehicle ride requests for users based on calendar events. At step 202, the ridehail application receives a notification of a new calendar event in the user's calendar. In some implementations, the calendar event is created on a mobile device and the ridehail application on the mobile device receives notification of the new event. The ridehail application associates the calendar event with the user's ridehail service account. In some implementations, user ridehail service account information is stored in a cloud and/or a central computing system. In some implementations, the user's calendar is stored in a cloud, and user calendar events are shared directly from cloud storage with the ridehail service.

At step 204, the ridehail service evaluates the new user calendar event to determine whether the event takes place at a specific location. For example, some new user calendar events include a specific event location. In some implementations, the event does not include location information and the method 200 ends at step 204. In some implementations, the event does not include location information, but other event details indicate that the event will occur at a specific location. For example, an event named "Rock Band Concert" or "Fifth Grade Play" is likely to occur at a specific location. In contrast, a calendar event such as "Call Grandma" or "Pay mortgage" is not likely to occur at any specific location. Thus, at step 206, even if a location is not specified, the ridehail service may determine that the event is likely to occur at a specific location and therefore, that the user may want a ride to that location.

Additionally, in some examples, the ridehail service and/or calendar have gathered enough information over time to speculate a location. In one example, the ridehail service can find public information about where "Rock Band" is playing on the specified date. In another example, the ridehail service and/or calendar knows which school the user (or other users linked to the user's account, such as the user's children) frequently drives to, and can suggest that school address as the event location. In another example, the calendar and/or ridehail service is also integrated with the user's email. In this example, the calendar and/or ridehail service detects an email confirmation and/or notification of the event, and finds the event location listed in the email. The calendar and/or ridehail service can then import the event location from the user's email.

At step 206, an autonomous vehicle ride is added to the user's calendar. In some examples, the autonomous vehicle ride remains contained within the calendar event. In some examples, the autonomous vehicle ride is added separately from the calendar event as a reminder to the user that the autonomous vehicle ride request was generated.

At step 208, the autonomous vehicle ride request is transmitted to the ridehail service. The ridehail service maintains the ride request in its database. In some examples, a user is reminded of the ride request shortly before the ride, and the user is given the option to cancel the ride request. If the user does not cancel the ride request, the ridehail service will fulfill the autonomously generated ride request and send an autonomous vehicle to the user's location for the drive to the calendar event. In some examples, when the user receives a ride request reminder, the user is given the option to confirm the ride request. In some examples, a user is reminded of the ride request one hour before the ride pick-up time, and given the option to confirm the ride request or cancel the ride request. In some examples, the ridehail service determines the pick-up time and sends a reminder to the user along with the estimated pick-up time, for example fifteen minutes before the estimated pick-up time. In other examples, a reminder is sent 24 hours before the ride. In some examples, a reminder including all scheduled rides for a given day is sent to the user at the beginning of the day.

In various examples, the method 200 of FIG. 2A is a zero-touch autonomous chauffeur service, in that the ride request for a user event is autonomously created and (unless the user cancels the ride) the autonomous vehicle ride is provided, all without any interaction between the user and the ridehail application.

FIG. 2B is a diagram illustrating another method 250 for providing autonomous chauffeur services, according to various embodiments of the disclosure. At step 252, a ridehail application receives permission to access a user's calendar. In various examples, the ridehail application prompts a user to adjust a setting in application preferences to allow calendar access, such that the ridehail application has ongoing calendar access unless the setting is later changed. Thus, once a user has chosen to allow the ridehail application calendar access, the ridehail application can silently access calendar events without prompting or interrupting the user. If a user has already adjusted a setting to always allow the ridehail service application access to the user's calendar, then the method 250 skips step 252.

At step 254, a new calendar event notification is received by the ridehail application. In some implementations, the calendar event is created on a mobile device and the ridehail application on the mobile device receives notification of the new event. The ridehail application associates the calendar event with the user's ridehail service account. At step 256, the ridehail service evaluates the new user calendar event to determine whether the event takes place at a specific location. In some implementations, the event does not include location information and the method 250 ends at step 256. In some implementations, the event does not include location information, but other event details indicate that the event will occur at a specific location, as discussed above with respect to FIG. 2A.

If, at step 256, it is determined that the calendar event likely takes place at a specific location, the method proceeds to step 258. At step 258, an autonomous vehicle ride prompt for the event is transmitted to the user. In some examples, on the user's device, the calendar event includes a ridehail service prompt inquiring whether the user would like an autonomous vehicle ride to (and/or from) the event. In some implementations, when the user creates a calendar event, the user can check a box to request an autonomous vehicle ride to (and/or from) the event. In some implementations, when a calendar event is imported from another application, such as from email, the user can choose to accept the imported event and can also choose whether to accept an autonomous vehicle ride to (and/or from) the event. In some implementations, the autonomous vehicle ride prompt includes two distinct prompts, a first prompt inquiring whether the user would like an autonomous vehicle ride to the event and a second prompt inquiring whether the user would like an autonomous vehicle ride from the event. In some examples, the prompts are check boxes on the calendar event. In some examples, the autonomous vehicle ride prompt is integrated into the calendar event details, and a user can select an autonomous vehicle ride by checking a box in the event description. In some examples, the autonomous vehicle ride prompt includes a third prompt inquiring the number of passengers that are included in the ride request.

At step 260, it is determined whether the autonomous vehicle ride prompt was accepted by the user. If the user accepts an autonomous vehicle ride request suggestion, the method proceeds to step 262. In some implementations, when the autonomous vehicle ride prompt at step 258 includes two prompts (a first prompt for a ride to the event and a second prompt for a ride from the event), if the user accepts either prompt, the ride suggestion is accepted at step 260 and the method proceeds to step 262.

At step 262, an autonomous vehicle ride is added to the user's calendar. In some examples, the autonomous vehicle ride remains contained within the calendar event. In some examples, the autonomous vehicle ride is added to the calendar as a separate event to remind the user of the scheduled autonomous vehicle ride.

At step 264, the autonomous vehicle ride request is transmitted to the ridehail service. The ridehail service maintains the ride request in its database. In some examples, as discussed above with respect to FIG. 2A, a user is reminded of the ride request shortly before the ride, and given the option to confirm the ride request or cancel the ride request. In some examples, the ridehail service determines the pick-up time, and, a selected period of time before the pick-up time, the ridehail service sends a reminder to the user along with the estimated pick-up time. In some examples, when a vehicle is dispatched to fulfill the ride request, the ridehail service sends a reminder to the user along with the estimated pick-up time. In some examples, a reminder including all scheduled rides for a given day is sent to the user at the beginning of the day. In one example, the user can delete or opt-out of any of the scheduled rides through the ridehail application. In one example, the user can delete or opt-out of any of the scheduled rides through the user calendar.

According to various implementations, the ridehail service determines the user location a selected period of time before the event. The current user location is used to determine the pick-up location, the driving route, and the (minimum) drive time to the event.

In some implementations, in addition to integrating with a user calendar, the ridehail application integrates with a user email. The ridehail application can recognize scheduled events confirmed in user emails and pull event details from the user emails. In some implementations, the ridehail application integrates with other user accounts and/or applications, such as airline accounts and/or applications, and movie theater accounts and/or applications. The ridehail application can pull details from the user accounts and/or applications to create ride requests without prompting or alerting the user. Then, as discussed above, an alert and opt-out/cancellation option is sent to the user at and/or before vehicle dispatch. In various implementations, the ridehail application is configured to use artificial intelligence to learn which calendar events, emails, or other information correlates with a ride request.

Figure 3:
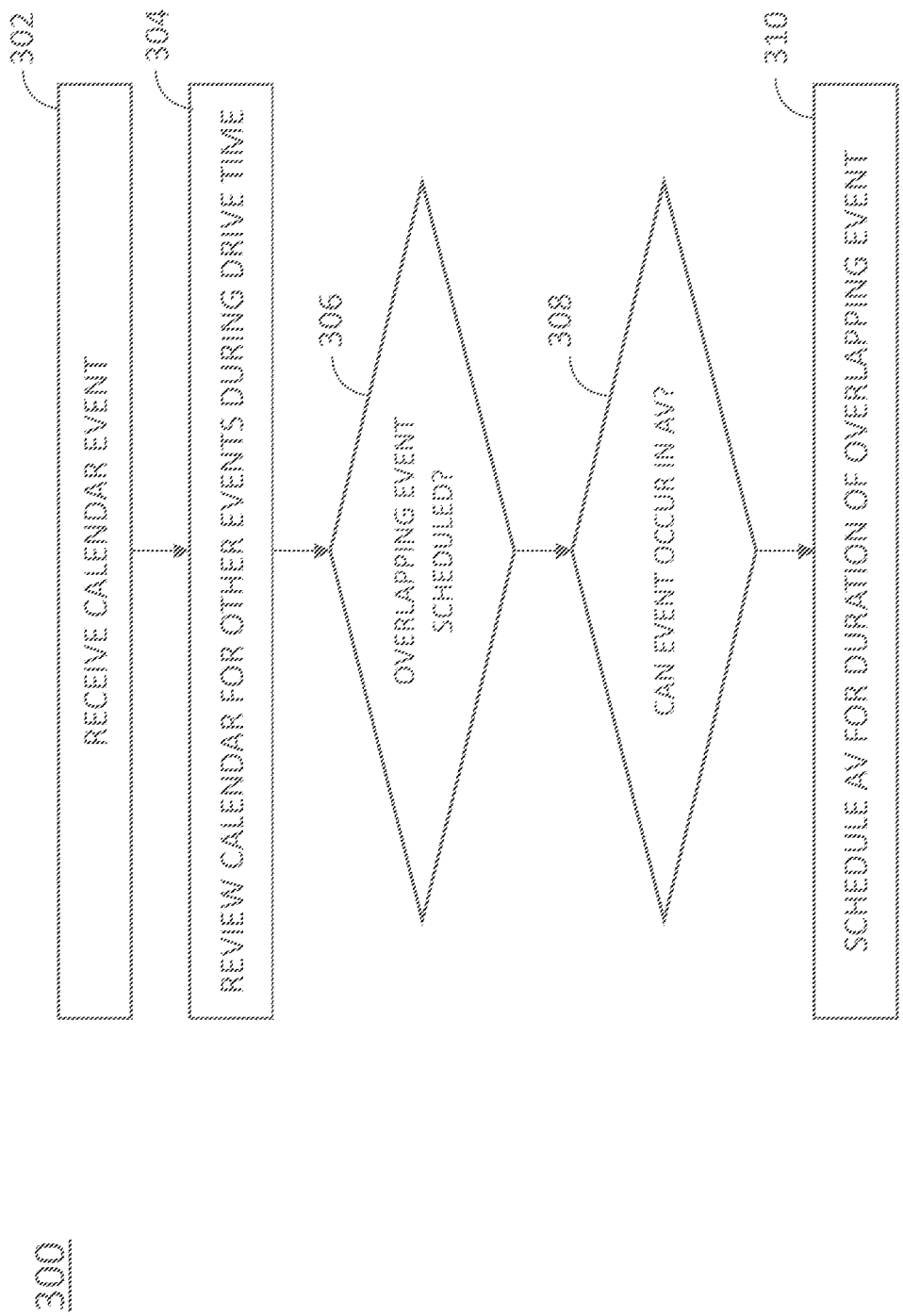
FIG. 3 is a diagram showing a method for autonomous chauffeur scheduling, according to some embodiments of the disclosure.

FIG. 3 is a diagram illustrating a method 300 for autonomous chauffeur services to review a user calendar and schedule autonomous vehicle rides, according to some embodiments of the disclosure. In particular, the method 300 addresses a situation in which another calendar event is scheduled during some or all of the drive time to a first event.

At step 302, a calendar event is received by a ridehail service. In some examples, this is a new calendar event. In some examples, the calendar event has been on the user's calendar, but the ridehail service is receiving it again, either in conjunction with another calendar event or upon reviewing the user's calendar for that particular day. At step 304, the ridehail service reviews the user's calendar for other scheduled events that overlap with the drive time to (or from) the first calendar event. If no overlapping event is scheduled, the method ends at step 306. At step 306, if there is an overlapping event scheduled, the method 300 proceeds to step 308.

At step 308, the ridehail service determines whether the overlapping event can occur in the autonomous vehicle. For example, if the overlapping event is a virtual meeting, the autonomous vehicle can be set up for the meeting to occur during the ride. A screen in the vehicle can be used for presentation of the meeting, and in-vehicle video and microphone sensors can be used to enable the user to virtually attend the meeting. Similarly, if the overlapping event is a phone call, a reminder to pay a bill, a reminder to place an online order, etc., these types of activities can take place in the autonomous vehicle during the ride. If at step 308, the ridehail service determines the overlapping event can occur inside the autonomous vehicle, the method 300 proceeds to step 310.

At step 310, the autonomous vehicle ride is scheduled for the duration of the overlapping event. Thus, if the overlapping event is a 30 minute meeting, but the autonomous vehicle ride only takes 12 minutes, the autonomous vehicle is scheduled to pick up the user before the start of the 30 minute meeting. The routing system can then select a longer driving route so that the autonomous vehicle arrives at the destination right on time.

If at step 308, it is determined that the overlapping event cannot occur in the autonomous vehicle, there are a number of steps that can be taken. In some examples, the method ends at step 308. In some examples, an alert is sent to the user regarding the overlapping event. The alert may ask the user to confirm a request for an autonomous vehicle ride to the first calendar event.

In some examples, the method 300 can be used for business-oriented users who might take multiple short phone/video meetings on the way to a physical location. Using the methods 200, 300 described above, the ridehail service can automatically detect which meetings involve transportation, which meetings do not involve transportation, and which meetings should be taken inside the car during transport to another meeting. For example, if a business-person has three 10 minute virtual meetings scheduled from 8-8:30 am, and needs to take the 25 minute trip from their home to the office by 8:30 am, the ridehail service can automatically shift the pickup time from ~8:05 am to ~7:55 am to allow for the three uninterrupted calls to take place inside the car. The ridehail service already has the virtual meeting links through the calendar access links, and thus, the autonomous vehicle can automatically connect the in-car screens to the meeting without additional input from the user.

In various implementations, users who integrate the autonomous chauffeur service into their calendars can still hail ridehail vehicles for spontaneous trips. Additionally, users can schedule rides within the ridehail application that don't appear on their calendars (e.g., daily commutes), and these rides will integrate with the autonomous chauffeur service. Additionally, in various implementations, the ridehail service receives permission to pull user data from other types of integrations such as data from travel agent itineraries, flight bookings (via email), and travel applications.

In some implementations, there is no specified return event after a trip to selected destinations, and the ridehail service suggests a return trip to the user based on average stay times. For example, if a user has scheduled a trip to the movie theater to watch the new Avengers movie, the ridehail service can determine the length of the movie and suggest a return trip home once the movie ends. The ridehail service can have a vehicle nearby ready to pick up the user if the user opts in at the end of the movie. Based on aggregate behavior as well as specific user patterns, ridehail service suggestions can improve over time.

In some implementations, the autonomous chauffeur service detects if two ridehail application users are at the same location and share a calendar event. Then, the ridehail service can proactively ask each of the users if they would like to share a ride. In some implementations, the ridehail application provides a way of selecting a carpooling option inside an original calendar event, such that users such as family members or housemates can ensure they travel together. In some implementations, a single user indicates that a ride request includes a ride request for several passengers, some of whom may not have a mobile device and/or ridehail application. In some implementations, when there is a large group of people, the ridehail application determines how many vehicles are needed and automatically sends multiple autonomous vehicles. Similarly, in some implementations, the ridehail service can detect when multiple autonomous vehicles are currently at separate locations but are driving to the same location, and, if the vehicles are close enough, the ridehail service can efficiently pool the vehicles together.

Example of an Autonomous Chauffeur Interface

Figure 4B:
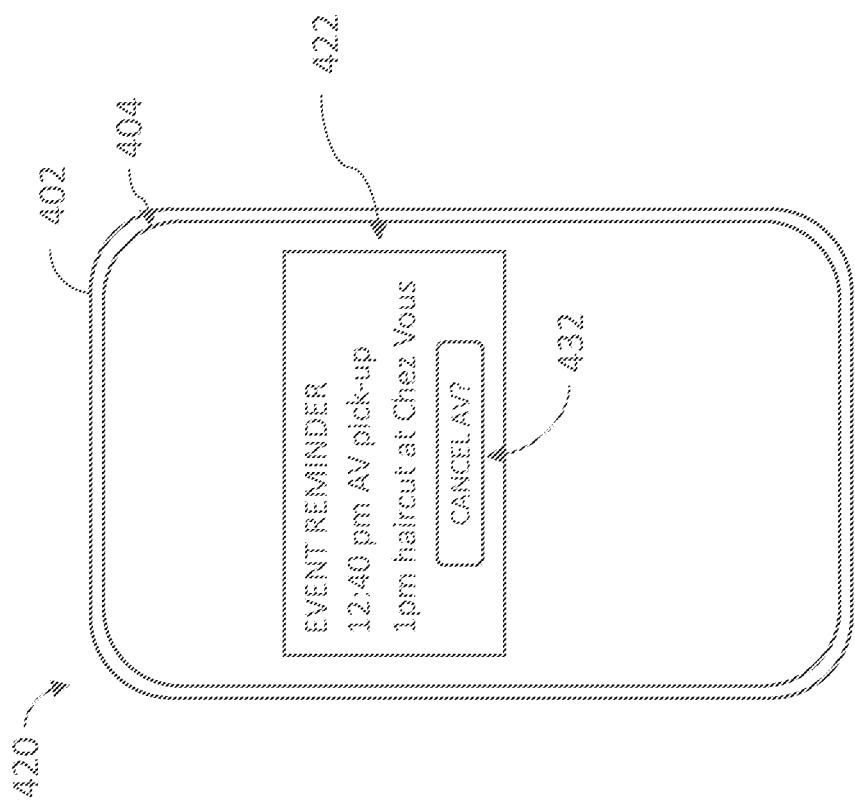
FIG. 4A-4C show examples of an interface, according to some embodiments of the disclosure.
Figure 4A:
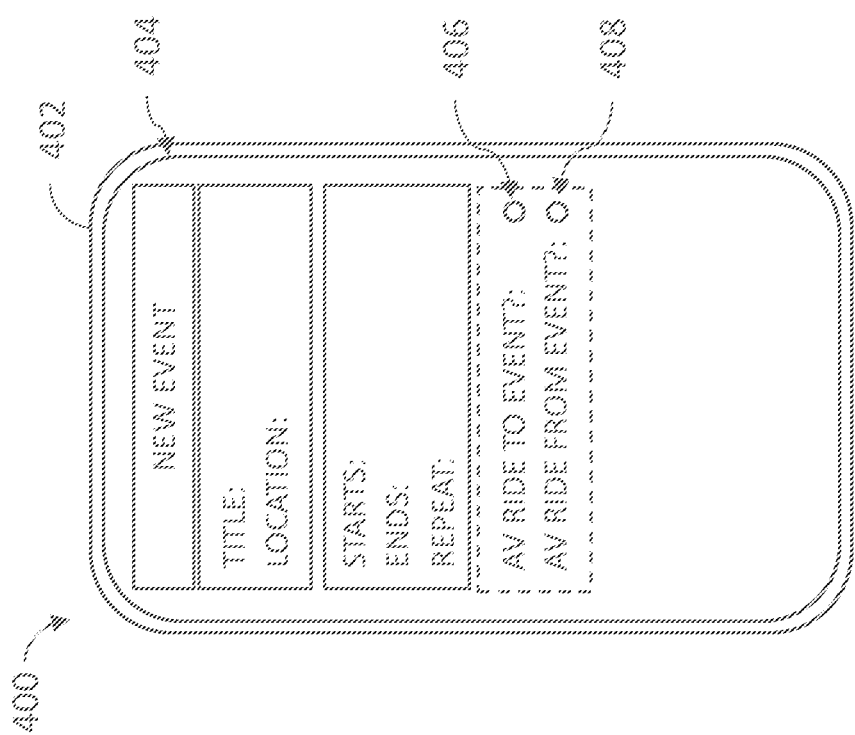
Figure 4C:
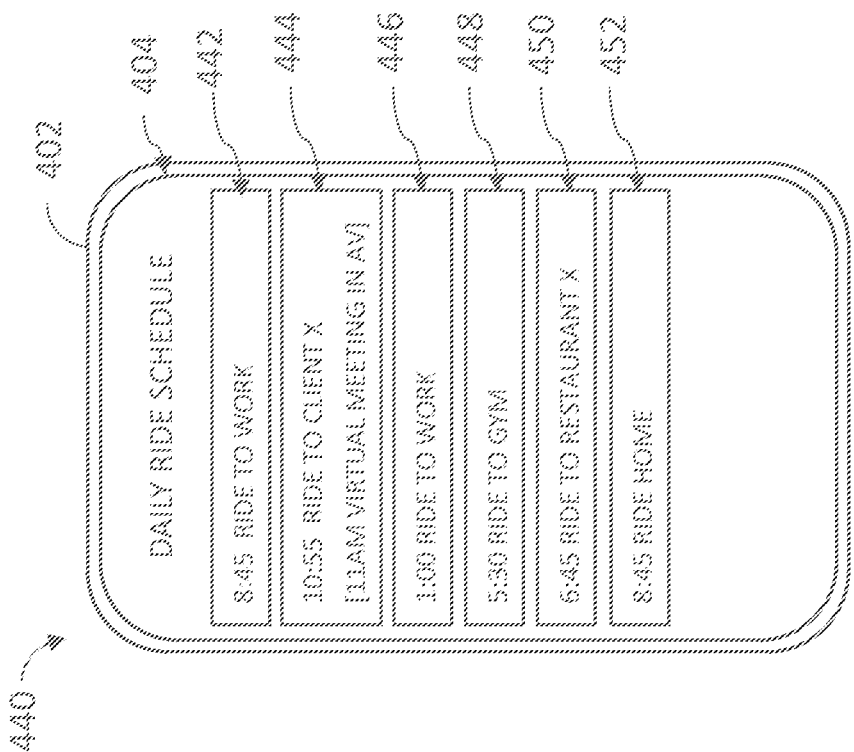

FIGS. 4A-4C show examples 400, 420, 440 of an interface for autonomous chauffeur services, according to some embodiments of the disclosure. FIG. 4A shows an example 400 of a device 402 showing an interface 404 for adding a new calendar event. In particular, the mobile device 402 screen shows an interface 404 through which a user can enter new event information, including the event title, the event location, the start time of the event, the end time of the event, and whether the event repeats. Additionally, the interface 404 provides the user with a first option 406 to select an autonomous vehicle ride to the event as well as a second option to select an autonomous vehicle ride from the event. In this manner, the user can request the autonomous vehicle rides when creating a new calendar event.

In other implementations, the user can adjust settings in the ridehail application such that autonomous vehicle rides to and/or from an event are automatically requested with new calendar events. In this example, the user does need to select the first 406 or second 408 option for an autonomous vehicle ride request to be generated with the calendar event.

FIG. 4B shows an example 420 of a ridehail application interface showing an event reminder 422 including a reminder about an autonomous vehicle ride. The event reminder 422 shows the event time, name, and location, and it also includes the pick-up time for the autonomous vehicle ride. In the example of FIG. 4B, the event (a haircut) is scheduled for 1 pm, and the user is notified that the autonomous vehicle pick-up time for the event is 12:40 pm. In various examples, the event reminder 422 is the first time the user is prompted regarding the autonomous vehicle ride. Additionally, in various examples, the event reminder 422 is the first time the user has had any interaction with the ridehail service regarding this particular ride, as all ride scheduling has occurred silently in the background. Along with the event notification 422, the user is given the option to cancel the autonomous vehicle ride by selecting the button 432.

FIG. 4C shows an example 440 of a ridehail application interface showing a daily ride schedule. According to some implementations, the ridehail application presents the user with a list of the scheduled rides for the day at a selected time each day. In some examples, the user can select the time the daily ride schedule is presented. In some examples, the daily ride schedule is presented at the time a morning alarm is set, or shortly thereafter. In some examples, a daily ride schedule notification is sent through the ridehail application to the mobile device, and the user opens the notification to show the daily ride schedule. In some examples, the daily ride schedule is the first time the ride requests 442, 444, 446, 448, 450, 452 are presented to the user. In some examples, the user can review the list of scheduled ride requests 442, 444, 446, 448, 450, 452, and swipe left on any ride request 442, 444, 446, 448, 450, 452 to delete the ride request. Thus, if, for example, the user plans to walk to the gym after work, the user can simply swipe left on the ride to gym ride 448 to delete the ride request.

Example of Autonomous Chauffeur Calendar Integration

Figure 5:
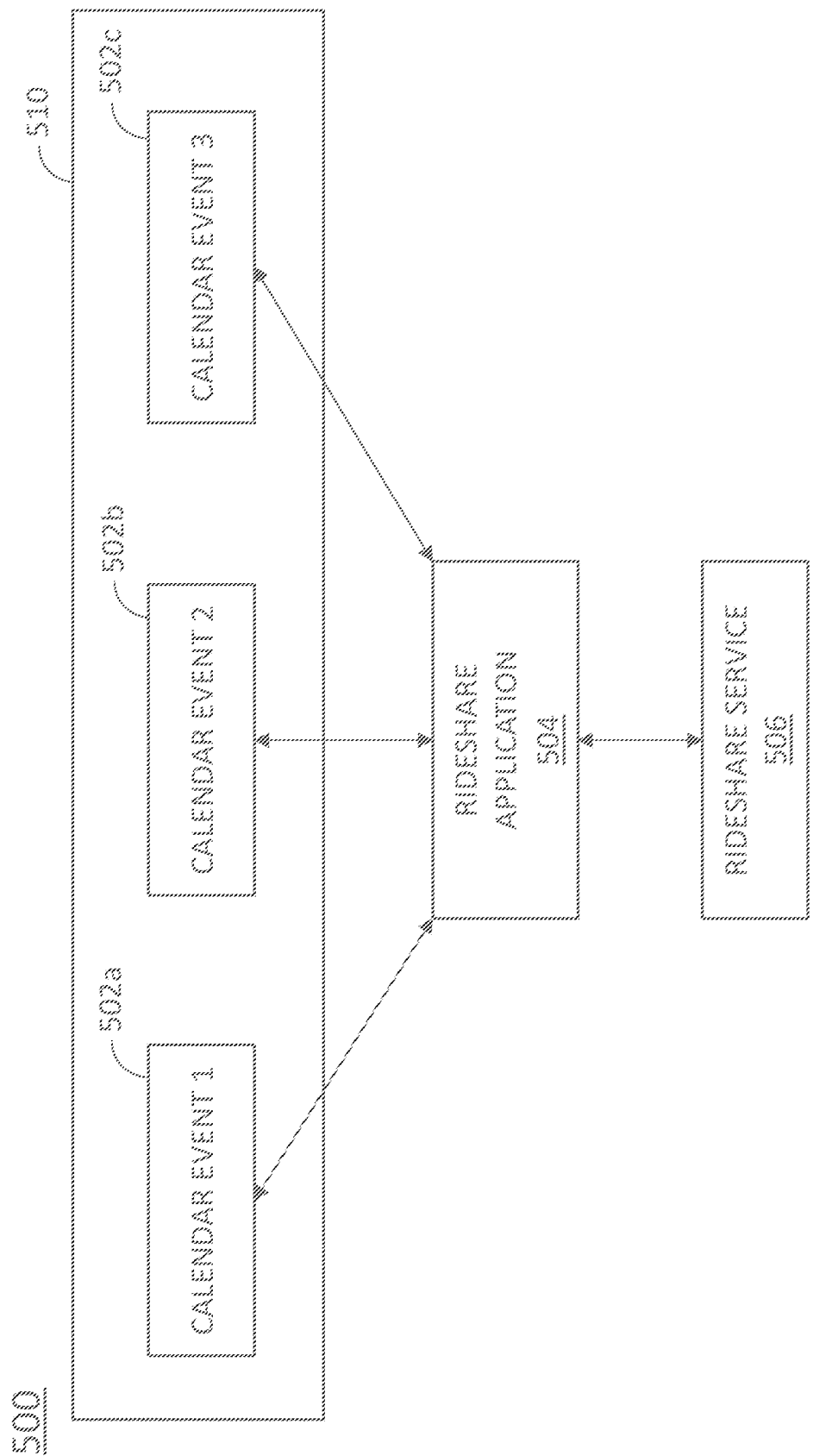
FIG. 5 is a diagram illustrating a ridehail service integrating calendar events, according to some embodiments of the disclosure.

FIG. 5 is a diagram 500 illustrating ridehail service integration with a user's calendar, according to some embodiments of the disclosure. The diagram shows a ridehail application 504 in communication with a ridehail service 506. In some examples, the ridehail application 504 is installed on a mobile device and the ridehail service 506 is cloud-based and/or a central computing system. In some examples, the ridehail application 504 and the ridehail service 506 communicate, such that information from the mobile device is shared with the ridehail service 506 via the ridehail application 504, and information from the mobile device is shared with the ridehail service via the ridehail application 504. In particular, in various examples, information pertaining to a user account logged into the ridehail application 504 can be shared between the ridehail application 504 and the ridehail service 506.

As shown in FIG. 5, the ridehail application 504 receives information regarding first 502a, second 502b and third 502c calendar events. In various examples, the ridehail application 504 receives the information about each of the first 502a, second 502b and third 502c calendar events at different times. When the ridehail application 504 receives a calendar event notification, the ridehail application reviews the calendar event data and determines whether to schedule an autonomous vehicle ride to, from, or during the calendar event. Additionally, when a new calendar event is added, the ridehail application 504 reviews other calendar events scheduled within a selected time period of the new calendar event to determine whether there is any potential overlap with a ride to, from, or during an event and another calendar event. Thus, in some examples, as described above with respect to FIG. 3, the ridehail application 504 can arrange to provide an autonomous vehicle ride during a virtual meeting, and provide a platform for the user to attend the virtual meeting from the autonomous vehicle.

In some examples, the first 502a, second 502b and third 502c calendar events are transmitted to the ridehail application 504. In some examples, one or more of the first 502a, second 502b and third 502c calendar events is transmitted from the ridehail application 504 to the calendar 510. In one example, when a first calendar event 502a is received at the ridehail application 504, the ridehail application creates the second calendar event 502b, where the second calendar event 502b is an autonomous vehicle ride to the first calendar event 502a. In some examples, data is added to a calendar event from the ridehail application 504. In various examples, the ridehail application 504 adds data such as a pick-up time for a calendar event.

In various implementations, the ridehail service 506 receives a large quantity of user calendar data from various ridehail applications 504 each for a different user account. The large amount of calendar data can be used in various ways to improve efficiency of the ridehail service. In some examples, the efficiency of ridehail service dispatch and routing systems can be improved based on calendar information indicating future demand and demand patterns. In some examples, the fleet can be load balanced in anticipation of future increased supply needs. For example, a large conference in a selected city scheduled for an upcoming weekend that will result in a significantly increased demand for autonomous vehicle services can be anticipated based on user calendar events, and autonomous vehicles can be shifted to the selected city from other cities before the conference begins. Additionally, information about future demand and demand patterns (such as a large conference) can be shared with local businesses to inform dynamic pricing models. For example, information about future demand and demand patterns can be shared with local hotels. Additionally, information about future demand and demand patterns can be shared with the selected city to help the city prioritize construction and infrastructure projects in anticipation of an upcoming event.

Example of Autonomous Vehicle Fleet

Figure 6:
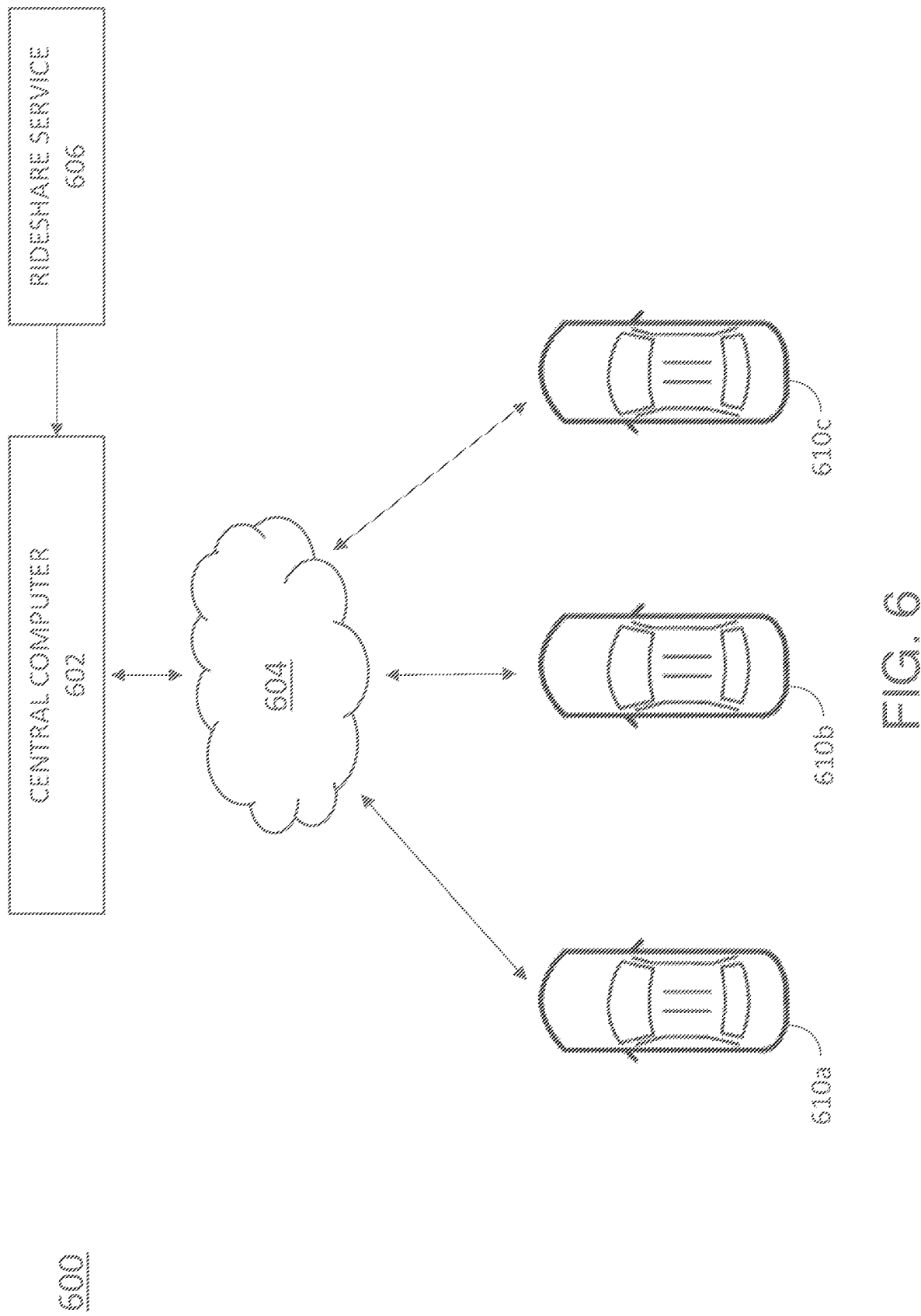
FIG. 6 is a diagram illustrating a fleet of autonomous vehicles in communication with a central computer, according to some embodiments of the disclosure.

FIG. 6 is a diagram 600 illustrating a fleet of autonomous vehicles 610a, 610b, 610c in communication with a central computer 602, according to some embodiments of the disclosure. The vehicles 610a-610c communicate wirelessly with a cloud 604 and a central computer 602. The central computer 602 includes a routing coordinator and a database of information from the vehicles 610a-610c in the fleet. Autonomous vehicle fleet routing refers to the routing of multiple vehicles in a fleet. The central computer also acts as a centralized ride management system and communicates with ridehail users via a ridehail service 606. Via the ridehail service 606, the central computer receives ride requests from various user ridehail applications and the ridehail service performs autonomous chauffeur services as described herein. In some implementations, the autonomous vehicles 610a-610c communicate directly with each other.

When a ride request is entered at a ridehail service 606, the ridehail service 606 sends the request to central computer 602. If the ridehail request is for a future date, the central computer 602 stores the information for future routing determinations. In some examples, on the day of the ride request, during a selected period of time before the ride begins, the vehicle to fulfill the request is selected and route for the vehicle is generated by the routing coordinator. In other examples, the vehicle to fulfill the request is selected and the route for the vehicle is generated by the onboard computer on the autonomous vehicle. In various examples, information pertaining to the ride, such as a virtual meeting scheduled during the ride, is transmitted to the selected vehicle 610a-610c. The route for the vehicle can depend on ride duration, with some rides scheduled to take longer than necessary to accommodate virtual meetings during the ride. Each of the autonomous vehicles 410a, 410b, 410c in the fleet are equipped to participate in providing virtual meeting services as described with respect to FIGS. 1B and 3. The vehicles 610a, 610b, 610c communicate with the central computer 602 via the cloud 604.

As described above, each vehicle 610a-610c in the fleet of vehicles communicates with a routing coordinator. Thus, information gathered by various autonomous vehicles 610a-610c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, a travelling preference includes a request for a longer ride to accommodate planned in-vehicle activities. In some examples, the routing coordinator uses collected position data corresponding to emergency events to generate a best route for an autonomous vehicle to avoid a potential emergency situation and associated unknowns.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 402 generates a route for each selected autonomous vehicle 410a-410c, and the routing coordinator determines a route for the autonomous vehicle 410a-410c to travel from the autonomous vehicle's current location to a first destination.

Example of a Computing System for Ride Requests

Figure 7:
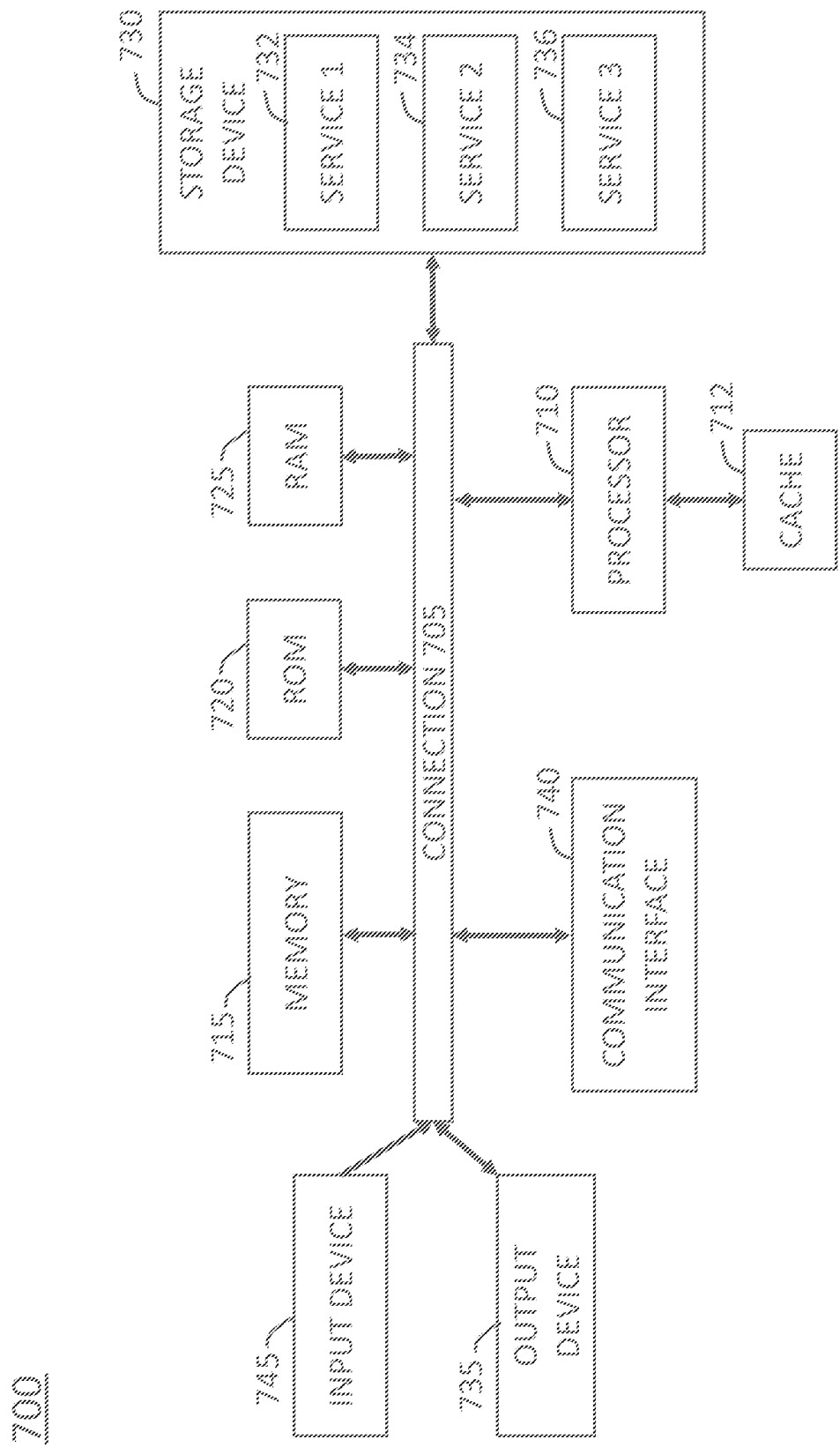
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computer 602, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for autonomous chauffeuring, comprising: receiving a calendar event from a user calendar; determining a location of the calendar event; adding an autonomous vehicle ride event to the user calendar, wherein the autonomous vehicle ride event comprises at least one of a first ride to the calendar event, a second ride from the calendar event, and a third ride during the calendar event; and transmitting an autonomous vehicle ride request to a ridehail service for the autonomous vehicle ride event.

Example 2 provides a method according to one or more of the preceding and/or following examples, further comprising transmitting an autonomous vehicle ride suggestion for the autonomous vehicle ride event to the user calendar.

Example 3 provides a method according to one or more of the preceding and/or following examples, further comprising receiving an autonomous vehicle ride acceptance.

Example 4 provides a method according to one or more of the preceding and/or following examples, further comprising presenting a ride cancellation option, wherein acceptance of the ride cancellation option results in deletion of the autonomous vehicle ride event and cancellation of the autonomous vehicle ride request.

Example 5 provides a method according to one or more of the preceding and/or following examples, wherein the calendar event is a first calendar event and further comprising receiving a second calendar event, wherein the second calendar event overlaps with the autonomous vehicle ride event.

Example 6 provides a method according to one or more of the preceding and/or following examples, further comprising determining whether at least one of the first calendar event and the second calendar event is a virtual meeting.

Example 7 provides a method according to one or more of the preceding and/or following examples, further comprising scheduling the autonomous vehicle ride event for the duration of the virtual meeting, determining a link for the virtual meeting, and autonomously connecting to the virtual meeting at the start time.

Example 8 provides a method according to one or more of the preceding and/or following examples, further comprising receiving, in a ridehail application, permission to access the user calendar.

Example 9 provides a method according to one or more of the preceding and/or following examples, wherein when the autonomous vehicle ride event comprises the third ride during the calendar event, the calendar event is a virtual meeting.

Example 10 provides a method according to one or more of the preceding and/or following examples, further comprising scheduling the autonomous vehicle ride event for the duration of the virtual meeting, determining a link for the virtual meeting, and autonomously connecting to the virtual meeting at the start time.

Example 11 provides a method according to one or more of the preceding and/or following examples, further comprising identifying additional participants for the calendar event, and proactively pooling the additional event participants in the ride request.

Example 12 provides a system for autonomous chauffeur services, comprising: a ridehail application configured to: receive a calendar event, determine a calendar event location, autonomously add an autonomous vehicle ride event associated with the calendar event to the user calendar, and transmit an autonomous vehicle ride request to a ridehail service for the autonomous vehicle ride event; and a central computing system configured to: receive the autonomous vehicle ride request, schedule a corresponding autonomous vehicle ride, and select an autonomous vehicle for the corresponding autonomous vehicle ride from an autonomous vehicle fleet.

Example 13 provides a system according to one or more of the preceding and/or following examples, wherein the ridehail application is further configured to present a ride cancellation option, wherein acceptance of the ride cancellation option results in deletion of the autonomous vehicle ride event and cancellation of the autonomous vehicle ride request.

Example 14 provides a system according to one or more of the preceding and/or following examples, wherein the calendar event is a first calendar event and wherein the ridehail application is further configured to receive a second calendar event, wherein the second calendar event overlaps with the autonomous vehicle ride event.

Example 15 provides a system according to one or more of the preceding and/or following examples, wherein the ridehail application is further configured to determine whether at least one of the first calendar event and the second calendar event is a virtual meeting.

Example 16 provides a system according to one or more of the preceding and/or following examples, wherein the ridehail application is further configured to schedule the autonomous vehicle ride event to begin before the virtual meeting start time and continue for the duration of the virtual meeting, determine a link for the virtual meeting, and autonomously connect to the virtual meeting at the start time.

Example 17 provides a system for autonomous chauffeur services in an autonomous vehicle fleet, comprising: a ridehail application configured to integrate with a digital calendar including a plurality of calendar events and further configured to autonomously create a plurality of autonomous vehicle ride requests associated with respective calendar events of the plurality of calendar events; and a ridehail service configured to receive the plurality of autonomous vehicle ride requests from the ridehail application, associate each of the plurality of autonomous vehicle ride requests with a user account, and create a schedule of ride requests.

Example 18 provides a system according to one or more of the preceding and/or following examples, wherein the ridehail application is further configured to present a ride cancellation option, wherein acceptance of the ride cancellation option results in cancellation of the autonomous vehicle request.

Example 19 provides a system according to one or more of the preceding and/or following examples, wherein the ridehail service is further configured to periodically present the schedule of ride requests for a selected period of time.

Example 20 provides a system according to one or more of the preceding and/or following examples, wherein the ridehail service is further configured to identify additional participants for each of the plurality of calendar events and proactively pool additional event participants to corresponding autonomous vehicle ride requests.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for autonomous chauffeuring, comprising:
   receiving a calendar event from a user calendar;
   determining that the calendar event is a virtual meeting;
   creating an autonomous vehicle ride event associated with the calendar event based on calendar event data;
   scheduling the autonomous vehicle ride event for a duration of the virtual meeting, wherein scheduling the autonomous vehicle ride event for the duration of the virtual meeting includes scheduling a pick-up time before a start of the virtual meeting and scheduling a drop-off after an end of the virtual meeting;
   adding the autonomous vehicle ride event to the user calendar without displaying a user prompt, wherein the autonomous vehicle ride event comprises a ride during the calendar event;
   transmitting an autonomous vehicle ride request including a pick-up location and the pick-up time to a ridehail service for the autonomous vehicle ride event;
   autonomously controlling an autonomous vehicle from a fleet to drive to the pick-up location for the pick-up time; and
   detecting, using interior vehicle sensors in a vehicle cabin, that there are multiple passengers attending the virtual meeting.

2. The method of claim 1, further comprising transmitting an autonomous vehicle ride suggestion for the autonomous vehicle ride event to the user calendar, and receiving an autonomous vehicle ride acceptance.

3. The method of claim 1, further comprising determining a destination for the autonomous vehicle ride based on previous autonomous vehicle rides and wherein transmitting the autonomous vehicle ride request includes transmitting the destination to the ridehail service.

4. The method of claim 1, wherein the calendar event is a first calendar event, the user calendar is a first user calendar, and the autonomous vehicle ride event is a first autonomous vehicle ride event, and further comprising:
   receiving a second calendar event from a second user calendar;
   determining that the second calendar event is the virtual meeting; and
   scheduling a second autonomous vehicle ride event for the duration of the virtual meeting.

5. The method of claim 4, wherein the pick-up location is a first pick-up location, and further comprising determining that a second pick-up location for the second autonomous vehicle ride event is the first pick-up location.

6. The method of claim 4, further comprising transmitting an inquiry to the first user calendar and the second user calendar to generate a shared ride event including the first autonomous vehicle ride event and the second autonomous vehicle ride event.

7. The method of claim 1, wherein receiving the calendar event includes receiving a carpool request.

8. The method of claim 7, further comprising identifying additional participants for the calendar event, and proactively pooling the additional event participants in the autonomous vehicle ride request.

9. A system for autonomous chauffeur services, comprising:
   an autonomous vehicle fleet including a plurality of autonomous vehicles;
   a ridehail application configured to:
      receive a calendar event from a user calendar;
      determine that the calendar event is a virtual meeting;
      create an autonomous vehicle ride event associated with the calendar event based on calendar event data;
      schedule the autonomous vehicle ride event for a duration of the virtual meeting, wherein scheduling the autonomous vehicle ride event for the duration of the virtual meeting includes scheduling a pick-up time before a start of the virtual meeting and scheduling a drop-off after an end of the virtual meeting;
      autonomously add the autonomous vehicle ride event associated with the calendar event to the user calendar without displaying a user prompt, and
      transmit an autonomous vehicle ride request to a ridehail service for the autonomous vehicle ride event; and
   a central computing system configured to:
      receive the autonomous vehicle ride request,
      schedule a corresponding autonomous vehicle ride,
      select a first autonomous vehicle for the corresponding autonomous vehicle ride from the plurality of autonomous vehicles, and
      dispatch the first autonomous vehicle to a pick-up location associated with the autonomous vehicle ride request, wherein the first autonomous vehicle includes an onboard computer configured to autonomously control the first autonomous vehicle to drive to the pick-up location, and to detect, using sensor data from interior vehicle sensor, that there are multiple passengers attending the virtual meeting.

10. The system of claim 9, wherein the ridehail application is further configured to transmit an autonomous vehicle ride suggestion for the autonomous vehicle ride event to the user calendar, and receive an autonomous vehicle ride acceptance.

11. The system of claim 9, wherein the ridehail application is further configured to determine a destination for the autonomous vehicle ride based on previous autonomous vehicle rides and to transmit the destination to the ridehail service.

12. The system of claim 9, wherein the calendar event is a first calendar event, the user calendar is a first user calendar, and the autonomous vehicle ride event is a first autonomous vehicle ride event, and wherein the ridehail application is further configured to:
   receive a second calendar event from a second user calendar;
   determine that the second calendar event is the virtual meeting; and
   schedule a second autonomous vehicle ride event for the duration of the virtual meeting.

13. The system of claim 12, wherein the pick-up location is a first pick-up location, and wherein the ridehail application is further configured to determine that a second pick-up location for the second autonomous vehicle ride event is the first pick-up location.

14. The system of claim 13, and wherein the ridehail application is further configured to generate a shared ride event including the first autonomous vehicle ride event and the second autonomous vehicle ride event.

15. A system for autonomous chauffeur services in an autonomous vehicle fleet, comprising:
a ridehail application configured to
integrate with a digital calendar including a plurality of calendar events, each of the plurality of calendar events lacking a ride request, wherein the plurality of calendar events includes a first calendar event,
autonomously create a plurality of autonomous vehicle ride requests associated with respective calendar events of the plurality of calendar events without displaying user prompts, wherein the plurality of autonomous vehicle ride requests includes a first autonomous vehicle ride associated with the first calendar event,
determine that first calendar event is a virtual meeting, and
schedule the first autonomous vehicle ride for a duration of the virtual meeting, including scheduling a pick-up time before a start of the virtual meeting and scheduling a drop-off after an end of the virtual meeting;
a ridehail service configured to receive the plurality of autonomous vehicle ride requests from the ridehail application, associate each of the plurality of autonomous vehicle ride requests with a user account, create a schedule of ride requests, and dispatch a first autonomous vehicle for each ride request of the schedule of ride requests; and
a fleet of autonomous vehicles including the first autonomous vehicle, wherein the first autonomous vehicle includes an onboard computer configured to, for the first autonomous vehicle ride request, control the first autonomous vehicle to drive to a corresponding first pick-up location, and detect, using sensor data from interior vehicle sensors, that there are multiple passengers attending the virtual meeting.

16. The system of claim 15, wherein the ridehail application is further configured to transmit an autonomous vehicle ride suggestion for the autonomous vehicle ride event to the user calendar, and receive an autonomous vehicle ride acceptance.

17. The system of claim 15, wherein the ridehail application is further configured to determine a destination for the autonomous vehicle ride based on previous autonomous vehicle rides from the user account and to transmit the destination to the ridehail service.

18. The system of claim 15, wherein the digital calendar is a first digital calendar and the plurality of autonomous vehicle ride requests is a first plurality of autonomous vehicle ride requests, and wherein the ridehail service is further configured to:
receive a second plurality of autonomous vehicle ride requests including a second autonomous vehicle ride for a second calendar event from a second digital calendar; and
determine that the calendar event is the virtual meeting.

19. The system of claim 18, wherein the ridehail service is further configured to generate a shared ride including the first autonomous vehicle ride and the second first autonomous vehicle ride.

20. The system of claim 18, wherein the first calendar event includes a first carpooling option selection and wherein the second calendar event includes a second carpooling option selection.

* * * * *